T. WILLIAMS.
ARTIFICIAL ARM.
APPLICATION FILED DEC. 21, 1917.

1,261,333.

Patented Apr. 2, 1918.

Inventor:
Thomas Williams,
by Hanks. Anneman
Atty

UNITED STATES PATENT OFFICE.

THOMAS WILLIAMS, OF DUNVANT, SWANSEA, ENGLAND.

ARTIFICIAL ARM.

1,261,333.

Specification of Letters Patent. Patented Apr. 2, 1918.

Application filed December 21, 1917. Serial No. 208,296.

*To all whom it may concern:*

Be it known that I, THOMAS WILLIAMS, a subject of the King of Great Britain, residing at 4 Goitre road, Dunvant, Swansea, Glamorganshire, England, have invented new and useful Improvements in Artificial Arms, of which the following is a specification.

This invention relates to certain improvements in artificial arms of the kind which have a wrist block and a hook or other implement arranged to swivel in a plug screwed therein as a substitute for the natural hand.

The present improvements are chiefly intended to afford greater mobility to the implement or hand substitute and to render it more adaptable to various positions and purposes, and consist broadly in introducing a joint in the shank part of the implement in such a way as to enable it to be set at any desired angle to the wrist or arm. Joints have already been proposed for this purpose but generally a tightening screw has been added to retain the implement in position.

The accompanying drawings exhibit the improvements as applied to an arm of the kind above specified.

Figure 1:
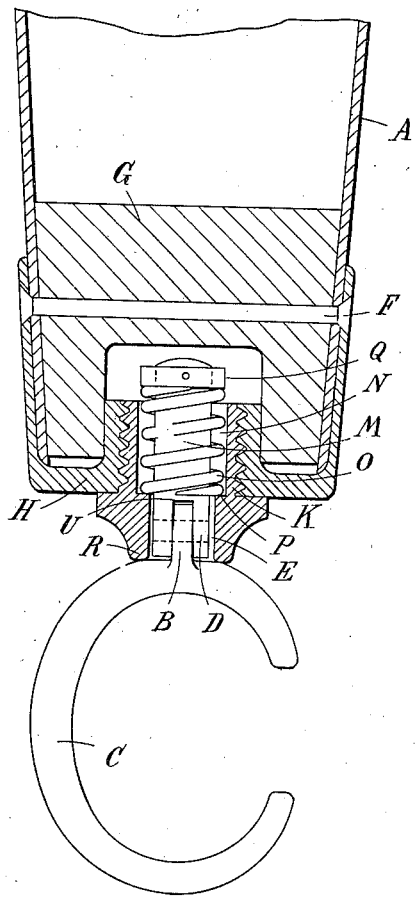
Figure 2:
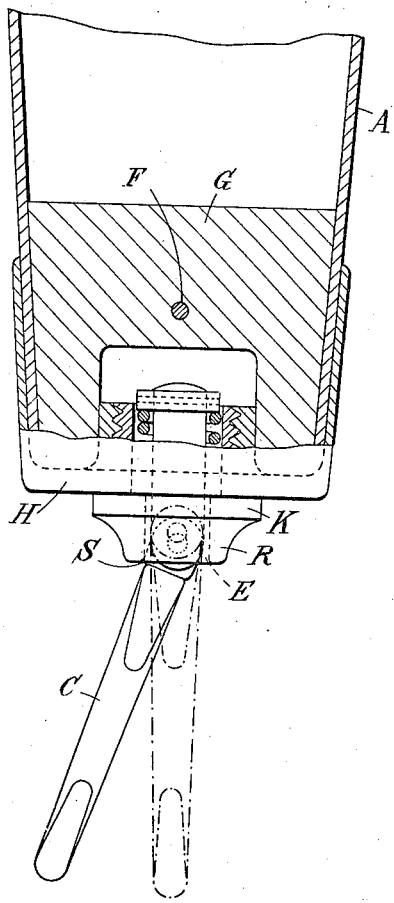
Figure 3:
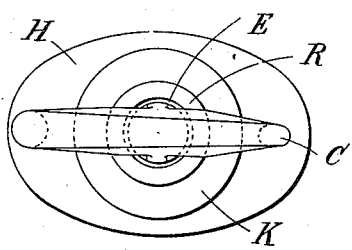

Figures 1 and 2 are sectional front and side views respectively of a wrist block and implement embodying the present improvements, and Fig. 3 an end view of the same.

In the example, the implement is a C-shaped hook. The stem M of the hook C is rotatable in a central socket E of a plug K which is screwed firmly into the casing or holder H of the wrist block G, contained in a sheath A. A pin F extends diametrically through the block G, sheath A, and holder H, to hold them together. The stem is also slidable longitudinally in the socket E, but is controlled by a spring O coiled around it within an enlarged part N of the socket. This spring is compressed between a nut Q on the top of the stem and a shoulder P in the socket, and this tends to force the stem upward until stopped by a ring or abutment meeting the rim R forming the mouth of the socket. The mutual friction of the abutting surfaces will prevent too free swiveling movement of the stem and enable the hook to remain set at any desired point of its axial rotation.

In order to give the hook greater mobility, it is arranged to be set at any desired declination from the axis of its stem. For this purpose the hook and its stem are connected by a knuckle joint transverse to the stem, by cutting a central slot U upward in the stem in the required direction, to receive a lug B, integral with the hook C and passing a pin D through the end of the stem and the said lug to form the pivot. The contour of the lug is preferably rounded so as not to project beyond the slot when the hook is swayed on its hinge. By this combined swivel and hinge arrangement for mounting the hook, it is obvious that it can be set in a practically unlimited variety of directions for various purposes.

In the example shown, the pivot D is normally within the mouth of the socket E, and the top of the hook C, which abuts against the rim of the mouth, acts as a lever when tilted by the swaying of the hook and draws down the stem, thus further compressing the spring and causing the hook to resume its normal axial direction when the sideward pressure is removed.

If, however, such automatic readjustment is not desired, the abutting part of the hook may be rounded cylindrically so as to avoid such leverage, or the pivot may be set at a point below the mouth and prevented from rising by a ring or stop fixed on the stem above the pivot.

The base of the holder H is preferably of oval section, like the natural wrist, as shown in Fig. 3.

It is obvious that a variety of implements may be attached in the same way as that shown for the hook, or an artificial or dummy hand may be similarly attached, for which the oval shape of the holder is especially suited.

To change one implement for another, it is only necessary to unscrew the plug K with the contained implement, then remove the retaining nut Q, withdraw the implement, substitute the other and replace the plug.

I claim:—

1. In an artificial arm, a hand-substitute or implement, a stem connected therewith by a transverse joint, an externally threaded hollow plug adapted to receive said stem, a cup with internally threaded hole in its base adapted to hold said plug, an axially recessed wrist block within said cup, a spring around said stem and a nut upon the latter adapted to press said spring against a shoulder within the hollow of said plug for the purpose of keeping the stem continually pushed inward.

2. In an artificial arm, a hand-substitute or implement, a stem connected therewith by a transverse joint, an externally threaded hollow plug adapted to receive said stem, a cup with internally threaded hole in its base adapted to hold said plug, an axially recessed wrist block within said cup, a spring around said stem and a nut upon the latter adapted to press said spring against a shoulder within the hollow of said plug, the engaging surfaces of the implement and the plug being in a plane at right angles to the stem, thereby producing a tendency for the implement to return under influence of the spring to its position in line with the stem after having been swung aside, the whole for the purpose specified.

THOMAS WILLIAMS.